United States Patent
Grüning et al.

(10) Patent No.: US 6,614,575 B1
(45) Date of Patent: Sep. 2, 2003

(54) OPTICAL STRUCTURE AND METHOD FOR PRODUCING THE SAME

(75) Inventors: Ulrike Grüning, München (DE); Volker Lehmann, München (DE); Reinhard Stengl, Stadtbergen (DE); Hermann Wendt, Grasbrunn (DE); Hans Reisinger, Grünwald (DE)

(73) Assignee: Infineon Technologies AG, Munich (DE)

( * ) Notice: Subject to any disclaimer, the term of this patent is extended or adjusted under 35 U.S.C. 154(b) by 244 days.

(21) Appl. No.: 09/636,521

(22) Filed: Aug. 10, 2000

Related U.S. Application Data

(63) Continuation of application No. PCT/DE98/03718, filed on Dec. 17, 1998.

(30) Foreign Application Priority Data

Feb. 10, 1998 (DE) .......................... 198 05 281

(51) Int. Cl.⁷ .................... G02F 1/03; H01L 47/00; G02B 6/10
(52) U.S. Cl. ................ 359/248; 359/351; 257/461; 257/465; 257/466; 257/444; 257/448; 257/3; 250/338.4; 250/370.1; 250/492.1; 250/492.2; 385/146; 385/129
(58) Field of Search .................. 257/461, 465, 257/466, 444, 448, 2, 3; 250/338.4, 370.1, 492.1, 492.2; 385/146, 129; 359/351, 248

(56) References Cited

U.S. PATENT DOCUMENTS

| | | | |
|---|---|---|---|
| 5,187,461 A | * 2/1993 | Brommer et al. | 333/219.1 |
| 5,262,021 A | * 11/1993 | Lehmann et al. | 205/655 |
| 5,389,943 A | 2/1995 | Brommer et al. | 343/909 |
| 5,403,752 A | * 4/1995 | Bruchhaus et al. | 205/656 |
| 5,644,156 A | * 7/1997 | Suzuki et al. | 257/3 |
| 5,726,464 A | * 3/1998 | Kumomi et al. | 257/101 |
| 5,987,208 A | * 11/1999 | Gruning et al. | 385/129 |
| 6,064,506 A | * 5/2000 | Koops | 349/41 |
| 6,246,068 B1 | * 6/2001 | Sato et al. | 257/3 |
| 6,261,469 B1 | * 7/2001 | Zakhidov et al. | 216/56 |

FOREIGN PATENT DOCUMENTS

| | | |
|---|---|---|
| DE | 195 26 734 A1 | 1/1997 |
| DE | 196 34 893 A1 | 5/1997 |
| EP | WO 97/33192 | * 9/1997 |

OTHER PUBLICATIONS

"Silicon Mach–Zehnder waveguide interferometers based on the plasma dispersion effect" (Treyz et al.), dated Aug. 12, 1991. Appl. Phys. Lett. 59(7) pps. 771–773.

"Direct measurement of the refractive index change of silicon with optically injected carriers" (Yu et al.), dated Mar. 11, 1996; Appl. Phys. Lett. 68(11) pps. 1546–1548.

\* cited by examiner

*Primary Examiner*—Evelyn Lester
(74) *Attorney, Agent, or Firm*—Laurence A. Greenberg; Werner W. Stemer; Ralph E. Locher

(57) ABSTRACT

An optical structure includes a substrate having semiconductor material and a grating structure. The grating structure has the property of emitting at least one frequency band so that light having a frequency from that frequency band cannot propagate in the grating structure. The grating structure has a configuration of pores and a defective region. The pores are disposed outside the defective region in a periodic array, and the periodic array is disturbed in the defective region. A surface of the grating structure is provided with a conductive layer at least in the vicinity of the defective region. A method for producing the optical structure is also provided.

6 Claims, 2 Drawing Sheets

OPTICAL STRUCTURE AND METHOD FOR PRODUCING THE SAME

CROSS-REFERENCE TO RELATED APPLICATION

This application is a continuation of copending International Application No. PCT/DE98/03718, filed Dec. 17, 1998, which designated the United States.

BACKGROUND OF THE INVENTION

Field of the Invention

The invention relates to an optical structure which is suitable for modulating or for switching light. The invention also relates to a method for producing the optical structure.

Optoelectronic components are integrated monolithically with integrated circuits for various applications, for example for optical data transmission. In that case, semiconductor-based optical structures are required as a switch or modulator for light.

The utilization of dispersion by free charge carriers to modulate light is disclosed in a paper by G. V. Treyz et al. in Appl. Phys. Lett., Vol. 59, 1991, pages 771 ff, and in a paper by L. S. Yu et al. in Appl. Phys. Lett., Vol. 68, 1996, pages 1546 ff. A mesa-shaped structure in a silicon substrate is used in that case as a waveguide. The light is guided in the waveguide by total reflection. Free charge carriers which pass into the region of the waveguide through the use of dispersion are injected through a PIN diode which is polarized in the conducting direction. Those free charge carriers change the refractive index in the waveguide and thereby influence the total reflection. The waveguide is detuned in that way. A relatively long path is required for the waveguide in order to influence the light intensity due to the low possibility of detuning the waveguides.

SUMMARY OF THE INVENTION

It is accordingly an object of the invention to provide an optical structure with which light can be modulated and which can be implemented more compactly than known structures, as well as a method for producing the same, that overcome the hereinafore-mentioned disadvantages of the heretofore-known devices and methods of this general type.

With the foregoing and other objects in view there is provided, in accordance with the invention, an optical structure, comprising a substrate having a grating structure with a surface; the substrate having semiconductor material at least in a vicinity of the grating structure; the grating structure emitting at least one frequency band preventing light having a frequency from the at least one frequency band from propagating in the grating structure; the grating structure having a configuration of pores with a defective region, the pores disposed outside the defective region in a periodic array, and the periodic array disturbed in the defective region; and a conductive layer disposed at the surface of the grating structure, at least in a vicinity of the defective region.

With the objects of the invention in view, there is also provided a method for producing an optical structure, which comprises producing a periodic array of depressions in a main surface of an n-doped silicon substrate, the array having a defective region in which the periodic array is disturbed; etching pores in the silicon substrate starting from the depressions by electrochemical etching in an electrolyte in contact with the main surface, by connecting the silicon substrate as an anode and by setting a current density influencing etching erosion; and providing a conductive layer at a surface of a grating structure of the silicon substrate at least in a vicinity of the defective region.

In the optical structure according to the invention, a grating structure is provided in a substrate. The substrate has semiconductor material at least in the region of the grating structure. It is implemented, in particular, from a III–V semiconductor or from silicon.

The grating structure has a photonic band gap, that is to say it has the property that it emits at least one frequency band so that light having a frequency from this frequency band cannot propagate in the grating structure. The grating structure constitutes a dielectric grating at which this light undergoes Bragg reflection.

The grating structure is formed by a configuration of pores having essentially the same cross section. The cross section of the pores is preferably round. It can also be angular, for example square. The pores are disposed in a periodic array outside a defective region in the grating structure. In contrast, the periodic array is disturbed in the defective region. The disturbance can be a changed grating spacing between at least two pores, the absence of at least one pore, or at least one pore which is filled with another material or has a different diameter.

In accordance with another feature of the invention, the pores run essentially perpendicular to a main surface of the substrate. The optical structure can thereby be produced extremely simply.

The surface of the grating structure is provided with a conductive layer at least in the region of the defective region. The surface of the grating structure in this case also includes the entire surface of the pores. The conductive layer likewise clads the latter.

An optical structure which has a substrate with a grating structure having a photonic band gap and a defective region has already been proposed in German Published, Non-Prosecuted Patent Application DE 195 26 734 A1. However, the problem of modulating or switching light is not addressed in German Published, Non-Prosecuted Patent Application DE 195 26 734 A1.

Light from the frequency band which corresponds to the photonic band gap is guided in the defective region in the optical structure by virtue of the fact that it cannot propagate into the grating structure because of its wavelength. The defective region therefore constitutes a very narrow-band filter. The transmission through the defective region can be varied by virtue of the fact that the refractive index and/or absorption are varied within the defective region. Such a variation in refractive index can be achieved by varying the free charge carrier concentration in the defective region. Such a variation can also be achieved by virtue of the fact that the defective region is irradiated with light, the energy of which is above the band edge of the semiconductor material. The variation in refractive index is preferably achieved by virtue of the fact that charge carriers are injected into the defective region over the conductive layer. The conductive layer thereby renders it possible to modulate or switch the light simply.

In accordance with a further feature of the invention, the conductive layer is implemented by a doped zone which differs from the substrate in conductivity type and/or doping concentration. The substrate is doped in this case. If the doped zone differs from the substrate in the conductivity type, the pn junction which is thereby formed is polarized in the non-conducting direction so as to form a space charge zone which is poor in charge carriers. The result of this is that light can pass without hindrance. If the pn junction is polarized in the conducting direction, the defective region is flooded with charge carriers. Absorption and refractive index are changed thereby, and the light flux is interrupted.

Alternatively, the conductive layer is implemented as a layer made from conductive material which is located on the surface and is transparent to light. Doped polysilicon, metal or metal silicide is particularly suitable for the conductive layer. The thickness of the layer is dimensioned in such a way that it is transparent to light.

It is within the scope of the invention to place the defective region between optical conductors in order to use the defective region as a modulator or switch. Defective regions having a strip-shaped geometrical form are likewise used as optical conductors. The defective region, which acts as a switch, is disposed between the optical conductors. Alternatively, the defective region can be constructed on the basis of its geometrical form as an optical conductor, the transmission of which can be varied by changing the charge carrier concentration.

Further properties of the optical structure can be set through the shape of the periodic array. If the periodic array is square, the optical structure is suitable for polarized light. In this case, photonic band gaps which do not overlap result for the two directions of polarization. If, by contrast, the array is trigonal, the photonic band gaps overlap for both directions of polarization of the light, and the optical structure is suitable for unpolarized light.

The optical structure can be implemented both as an individual component and in an integrated circuit.

The optical structure can be formed by one anisotropic etching in a substrate.

The optical structure is preferably produced on the basis of n-doped silicon through the use of electrochemical etching.

The first step in this case is to produce depressions disposed in a periodic array in a main surface of an n-doped silicon substrate. In this case, the array has a defective region in which at least one depression is missing or the spacing between neighboring depressions is varied. The electrochemical etching is carried out in an electrolyte which is preferably fluoride-containing and acidic and is in contact with the main surface. A voltage is applied between the electrolyte and the silicon substrate in such a way that the silicon substrate is connected as an anode. As a result, minority charge carriers move in the n-doped silicon to the main surface in contact with the electrolyte. A space charge zone is formed at this main surface. Since the field strength in the region of the depressions in the main surface is greater than outside thereof, the minority charge carriers move preferentially to these points. This produces a self-adjusted structuring of the surface. The deeper an incipiently small depression becomes due to the etching, the more minority charge carriers move there because of the increased field strength, and the stronger is the etching attack at this point. The pores grow with increasing etching time. A conductive layer which covers at least the defective region is subsequently produced on the surface of the pores. The conductive layer can be formed by diffusion in the form of a doped zone, or by CVD deposition of a thin, conductive layer.

Other features which are considered as characteristic for the invention are set forth in the appended claims.

Although the invention is illustrated and described herein as embodied in an optical structure and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
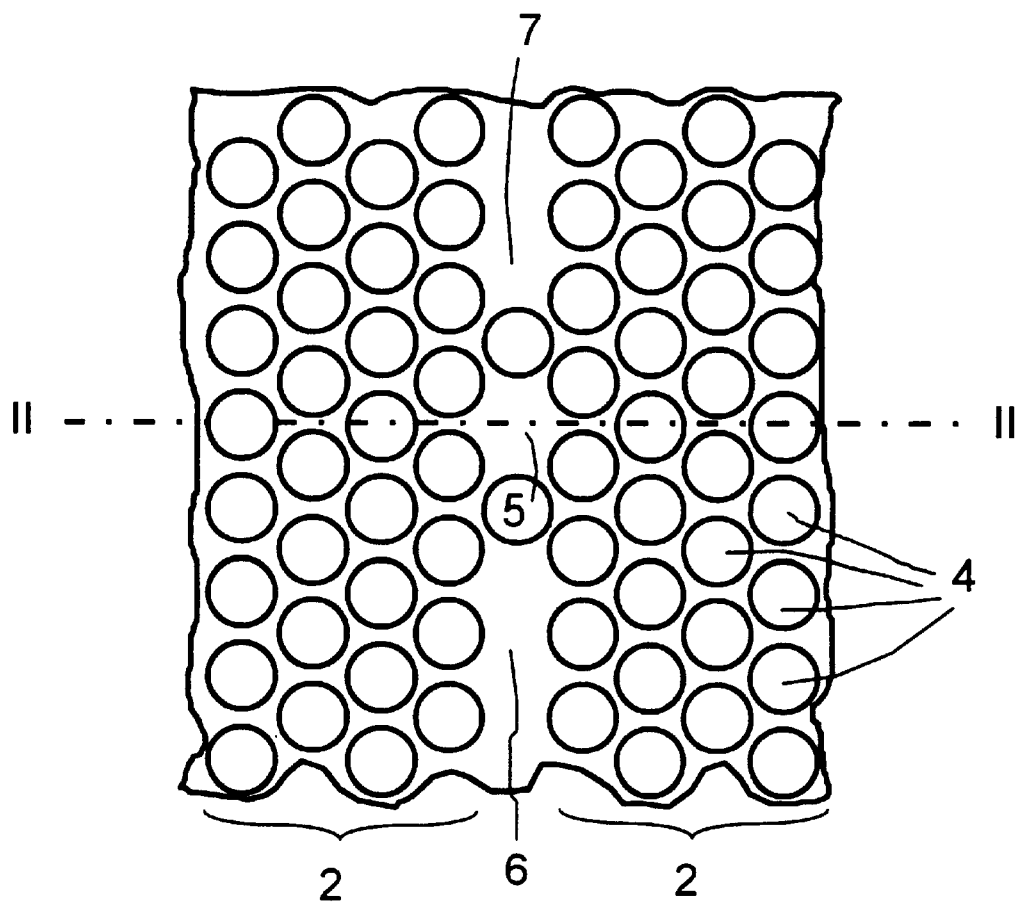
FIG. 1 is a fragmentary, diagrammatic, plan view of an optical structure with a defective region which is disposed between two optical conductors.
Figure 2:
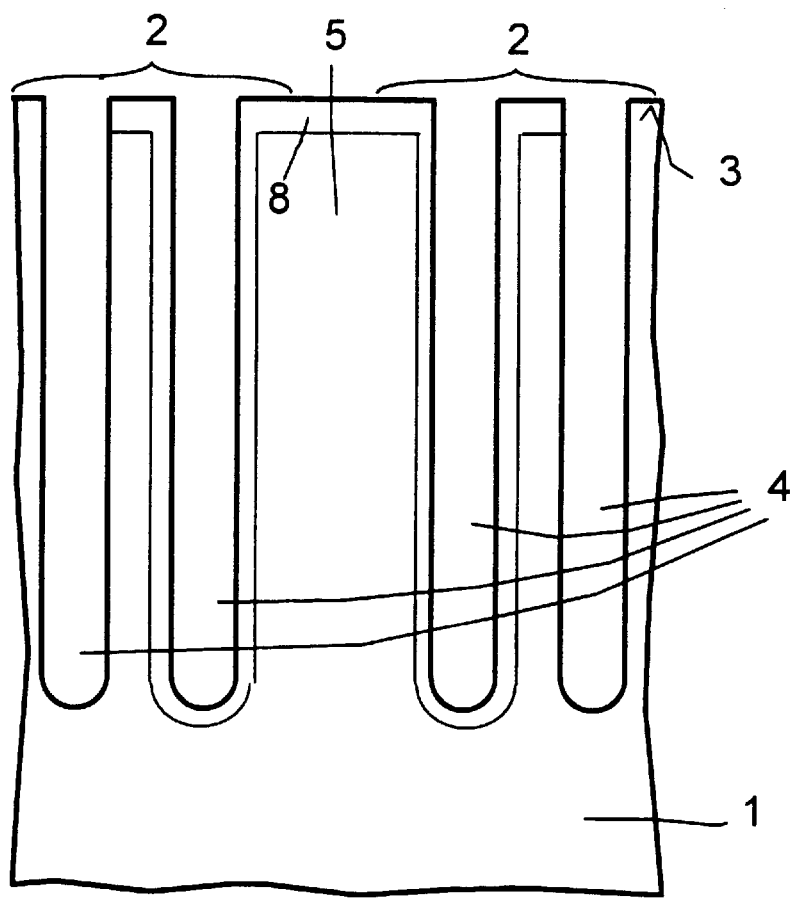
FIG. 2 is a fragmentary, sectional view of the optical structure, which is taken along a line II—II in FIG. 1.

Referring now in detail to FIGS. 1 and 2 of the drawings, there is seen a substrate or carrier 1 which is made from n-doped, monocrystalline silicon and includes a grating structure 2. The grating structure 2 is formed by a periodic configuration of pores 4 which run essentially perpendicular to a main surface 3 of the substrate 1 and have an essentially round cross section. A defective region 5, a first optical conductor 6 and a second optical conductor 7 are disposed in the grating structure 2. The periodic array is disturbed in the region of the defective region 5, the first optical conductor 6 and the second optical conductor 7 by virtue of the fact that there are no pores 4 disposed in this region. For example, a pore 4 is missing in the defective region 5. The first optical conductor 6 and the second optical conductor 7 in each case have the extent of a pore 4 in width. At least one pore 4 is disposed in each case between the first optical conductor 6 and the defective region 5 and between the second optical conductor 7 and the defective region 5.

The pores 4 are disposed in a trigonal array. In this case, the spacing of neighboring pores 4 is used to set a wavelength region of light for which waveguidance occurs in the defective region 5, in the first optical conductor 6 and in the second optical conductor 7. A relationship $a/\lambda \approx 0.2$ to $0.5$ generally holds in this case for a spacing $a$ of midpoints of neighboring pores and a wavelength $\lambda$. The wavelength of the guided light can be displaced over the entire wavelength region in which the material of the substrate 1 does not absorb, by appropriate configuration of the pores in the array. If the substrate 1 is formed of silicon, as in this exemplary embodiment, waveguidance can be set reliably in a wavelength region of between 1.1 $\mu$m and 100 $\mu$m. The spacing a between neighboring pores 4 is 1.5 $\mu$m to 2.5 $\mu$m for waveguidance in a wavelength region of between 5 and 6 $\mu$m. The pores 4 have a diameter of 1.3 $\mu$m to 2.2 $\mu$m. The depth of the pores 4 is 5 $\mu$m to 200 $\mu$m.

A doped zone 8 which is provided covers at least the surface of the defective region 5. The doped zone 8 is p-doped with a dopant concentration of $10^{19}$ cm$^{-3}$, and has a depth of 200 to 500 nm. The doped zone 8 acts as a conductive layer and forms a pn junction with the substrate 1. All of the dimensions are reduced by a factor of 3 for waveguidance in the case of a wavelength of 1.5 $\mu$m.

During operation of the optical structure, the pn junction is polarized in the non-conducting direction. A potential of $-2$ volts is applied to the doped zone 8 through a non-illustrated contact for this purpose. The substrate 1 is connected to ground potential through a further non-illustrated contact. A space charge zone which is poor in charge carriers is thereby formed in the zone of the defective region 5. As a result, the defective region 5 is transparent to light which is guided through the first optical conductor 6 and the second optical conductor 7.

If a voltage of +2 volts is applied to the doped zone 8 while the substrate 1 continues to be connected to ground potential, the pn junction is polarized in the conducting direction. The defective region 5 is thereby flooded with free charge carriers. These free charge carriers cause a variation in refractive index which varies the transmission properties of the defective region 5 in such a way that light guided in the first optical conductor 6 and the second optical conductor 7 is no longer transmitted through the defective region 5. The light flux is interrupted.

Depressions which are disposed in accordance with the pores 4 in a periodic array are produced in the main surface 3 of the substrate 1, which has a resistivity of 1 ohm cm, for example, in order to produce the optical structure. No depressions are produced in the region of the defective region 5, the first optical conductor 6 and the second optical conductor 7. The depressions are produced, for example, after the production of a photo-resist mask with the aid of conventional photolithography and subsequent alkaline etching. The main surface 3 of the substrate 1 is brought into contact with a fluoride-containing, acidic electrolyte after removal of the photo-resist mask. The electrolyte has a hydrofluoric acid concentration of 1 to 50 percent by weight, preferably 3 percent by weight. An oxidizing agent, for example hydrogen peroxide, can be added to the electrolyte in order to suppress the development of hydrogen bubbles on the surface 3 of the substrate 1.

The substrate 1 is connected as an anode. A voltage of 0 to 20 volts, preferably 3 volts, is applied between the substrate 1 and the electrolyte. The substrate 1 is illuminated with light from a rear side opposite the main surface 3 so that a current density of, for example 14 mA per $cm^2$ is set. Starting from the depressions, the pores 4 which are produced during the electrochemical etching run essentially perpendicular to the main surface 3. After an etching time of 5 minutes, the pores 4 have a dimension of 5 $\mu$m perpendicular to the main surface 3. The diameter of the pores 4 is approximately 2 $\mu$m.

Upon termination of the electrochemical etching, the doped zone 8 is formed with a dopant concentration of $10^{19}$ $cm^{-3}$ by a diffusion with boron. Finally, non-illustrated contacts to the doped zone 8 and the substrate 1 are produced by vapor deposition and structuring of metal.

As an alternative to polarization in the conducting direction, during operation of the optical structure the defective region can also be flooded with free charge carriers through the use of irradiation with light having a wavelength of 632.8 nm, for example.

We claim:

1. An optical structure, comprising:

a substrate having a grating structure with a surface;

said substrate having semiconductor material at least in a vicinity of said grating structure;

said grating structure emitting at least one frequency band preventing light having a frequency from said at least one frequency band from propagating in said grating structure;

said grating structure having a configuration of pores with a defective region, said pores disposed outside said defective region in a periodic array, and said periodic array disturbed in said defective region; and a conductive layer disposed at said surface of said grating structure, at least in a vicinity of said defective region.

2. The optical structure according to claim 1, wherein said substrate is doped; and said conductive layer is implemented by a doped zone differing from a doping of said substrate in at least one of conductivity type and doping concentration.

3. The optical structure according to claim 1, wherein said substrate has a main surface, and said pores run substantially perpendicular to said main surface.

4. The optical structure according to claim 1, wherein said substrate contains monocrystalline silicon, and said pores are formed by electrochemical etching.

5. The optical structure according to claim 4, wherein said pores include neighboring pores having a mutual spacing in said periodic array in a range of between 0.5 and 25 $\mu$m, and said pores have a diameter in a range of between 0.4 $\mu$m and 23 $\mu$m.

6. The optical structure according to claim 1, wherein said periodic array is trigonal.

\* \* \* \* \*